(12) United States Patent
Speidel

(10) Patent No.: US 11,990,650 B2
(45) Date of Patent: May 21, 2024

(54) ASSEMBLY FOR AN ELECTROCHEMICAL SYSTEM, STACK, AND ELECTROCHEMICAL SYSTEM

(71) Applicant: REINZ-Dichtungs-GmbH, Neu-Ulm (DE)

(72) Inventor: André Speidel, Schwendi (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 174 days.

(21) Appl. No.: 17/454,463

(22) Filed: Nov. 10, 2021

(65) Prior Publication Data
US 2022/0149393 A1 May 12, 2022

(30) Foreign Application Priority Data
Nov. 11, 2020 (DE) ............... 20 2020 106 459.2

(51) Int. Cl.
*H01M 8/0258* (2016.01)
*H01M 8/1004* (2016.01)

(52) U.S. Cl.
CPC ....... *H01M 8/0258* (2013.01); *H01M 8/1004* (2013.01)

(58) Field of Classification Search
CPC ............ H01M 8/0258; H01M 8/1004; H01M 8/0202; H01M 8/0273; H01M 8/04089; H01M 8/2465; H01M 8/2483; H01M 8/0256; C25B 9/60; C25B 9/75
See application file for complete search history.

(56) References Cited

U.S. PATENT DOCUMENTS

| | | | |
|---|---|---|---|
| 2002/0102453 A1* | 8/2002 | Suenaga | H01M 8/242 429/465 |
| 2009/0081521 A1 | 3/2009 | Yamamoto | |
| 2011/0165492 A1 | 7/2011 | Wagner et al. | |
| 2012/0070761 A1 | 3/2012 | Goebel | |
| 2016/0013509 A1 | 1/2016 | Iwasaki et al. | |
| 2019/0341634 A1* | 11/2019 | Kageyama | H01M 8/2475 |

FOREIGN PATENT DOCUMENTS

| | | |
|---|---|---|
| DE | 10236998 A1 | 3/2004 |
| DE | 102016225444 A1 | 6/2018 |
| DE | 102017202705 A1 | 8/2018 |
| EP | 1968149 A1 | 9/2008 |

* cited by examiner

*Primary Examiner* — Stewart A Fraser
(74) *Attorney, Agent, or Firm* — McCoy Russell LLP

(57) ABSTRACT

An assembly for an electrochemical system, which comprises a first separator plate, a second separator plate, and a membrane electrode assembly arranged between the separator plates for forming an electrochemical cell between the separator plates. A stack comprising a plurality of such assemblies, and an electrochemical system comprising a plurality of such assemblies and/or a stack. The electrochemical system may be a fuel cell system, an electrochemical compressor, an electrolyzer, a redox flow battery, or a humidifier for an electrochemical system.

15 Claims, 9 Drawing Sheets

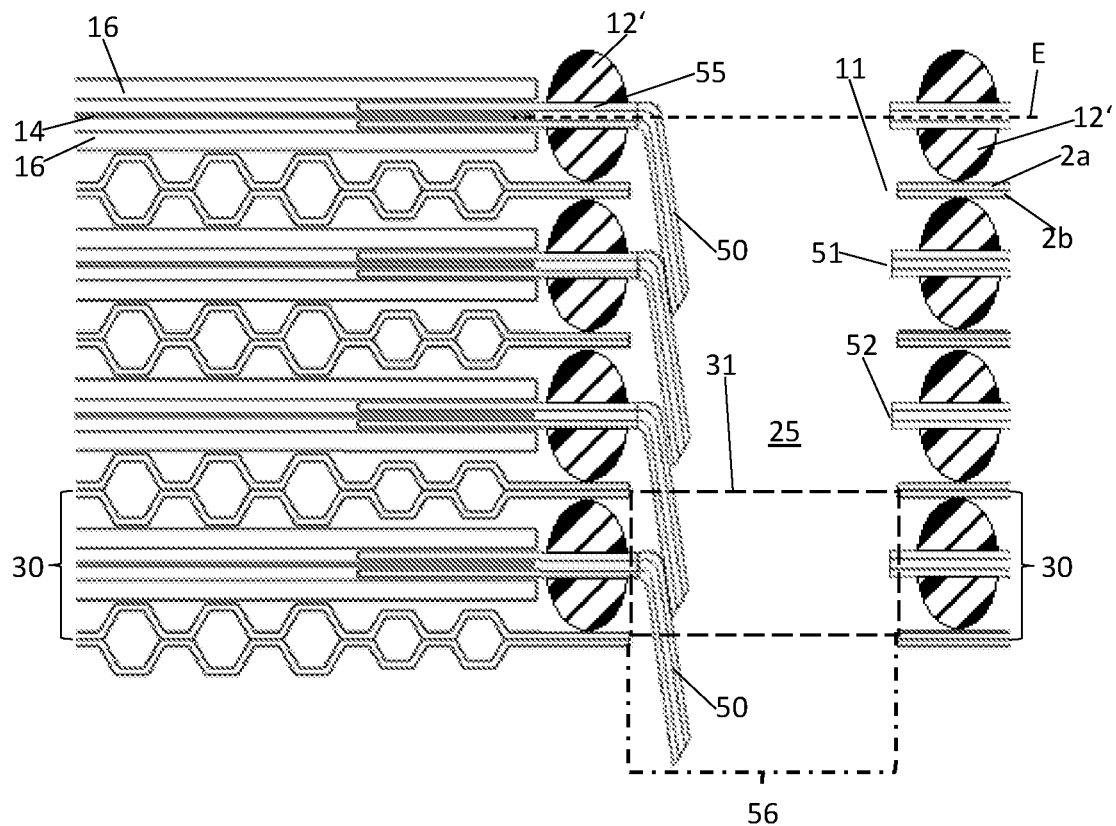
Fig. 11
Fig. 14A
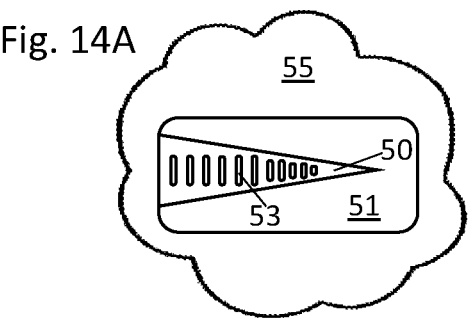
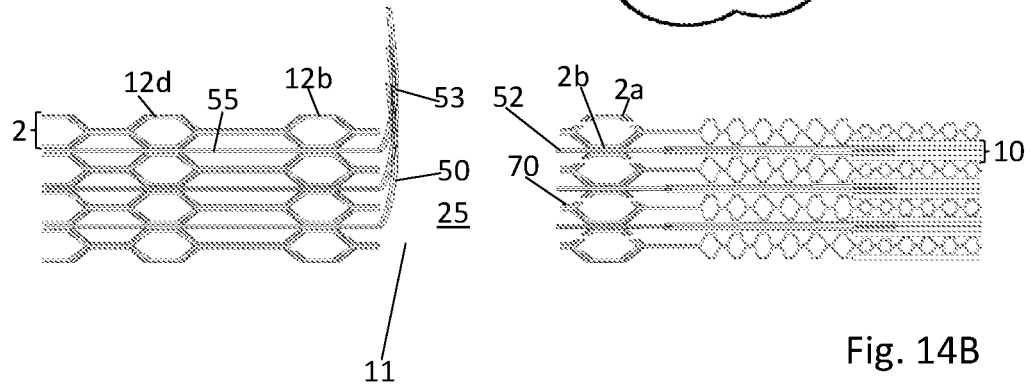
Fig. 14B

ASSEMBLY FOR AN ELECTROCHEMICAL SYSTEM, STACK, AND ELECTROCHEMICAL SYSTEM

CROSS-REFERENCE TO RELATED APPLICATION

The present application claims priority to German Utility Model Application No. 20 2020 106 459.2, entitled "ASSEMBLY FOR AN ELECTROCHEMICAL SYSTEM, STACK, AND ELECTROCHEMICAL SYSTEM", and filed on Nov. 11, 2020. The entire contents of the above-listed application is hereby incorporated by reference for all purposes.

TECHNICAL FIELD

The present disclosure relates to an assembly for an electrochemical system, which comprises a first separator plate, a second separator plate, and a membrane electrode assembly arranged between the separator plates for forming an electrochemical cell between the separator plates. The present disclosure additionally relates to a stack comprising a plurality of such assemblies, and to an electrochemical system comprising a plurality of such assemblies and/or a stack. The electrochemical system may be a fuel cell system, an electrochemical compressor, an electrolyzer, or a redox flow battery. The assembly or stack can in principle also be used in a humidifier for an electrochemical system. The membrane electrode assembly is then replaced by a humidifier membrane.

BACKGROUND AND SUMMARY

Known electrochemical systems usually comprise a stack of electrochemical cells, which are each separated from one another by separator plates. Such separator plates may serve for example for indirectly electrically contacting the electrodes of the individual electrochemical cells (for example fuel cells) and/or for electrically connecting adjacent cells (series connection of the cells). A bipolar plate typically bounds an electrochemical cell on each side. Bipolar plates are typically formed of two separator plates which are joined together. The separator plates (individual plates) of the bipolar plate may be joined together in an adhesively joined manner, for example by one or more welded joints, such as by one or more laser-welded joints.

The electrochemical cells each comprise one or more membrane electrode assemblies (MEAs). The MEAs may have one or more gas diffusion layers, which are usually oriented towards the separator plates and are configured for example as a metal or carbon fleece. In addition, the MEAs each have at least one frame-like reinforcing layer, which surrounds the electrochemically active region of the MEA and is typically made of an electrically insulating material. The frame-like reinforcing layer(s) is/are sometimes also referred to as the edge portion or reinforcing edge of the MEA.

The separator plates and bipolar plates may each have or form structures which are configured for example to supply one or more media to the electrochemical cells bounded by adjacent bipolar plates and/or to remove reaction products therefrom. The media may be fuels (for example hydrogen or methanol) or reaction gases (for example air or oxygen). Furthermore, the bipolar plates and/or the separator plates may have structures for guiding a cooling medium through the bipolar plate, for instance through a cavity enclosed by the separator plates of the bipolar plate. Furthermore, the bipolar plates may be configured to transmit the waste heat that arises when converting electrical and/or chemical energy in the electrochemical cell, and also to seal the various media channels and cooling channels with respect to one another and/or with respect to the outside.

Furthermore, the bipolar plates and separator plates usually each have a plurality of through-openings. Through the through-openings, the media and/or the reaction products can be conducted to the electrochemical cells bounded by adjacent bipolar plates of the stack or into the cavity formed by the separator plates of the bipolar plate, or can be conducted out of the cells or out of the cavity. The through-openings are usually arranged in alignment with one another and form fluid lines which extend in the stacking direction, that is to say perpendicular to the plate planes of the respective separator plates and bipolar plates.

To make it easier to produce such an electrochemical system and to limit costs, the separator plates and bipolar plates in the stack are usually designed to be structurally identical. Likewise, the MEAs are usually designed to be structurally identical to one another. Consequently, the respective fluid line typically has a periodically constant cross-sectional size and shape along the stacking direction. However, to supply media and/or cooling medium to the respective cells in an equal manner along the stacking direction, taking into account a pressure drop in the fluid line along the stacking direction in the fluid flow direction, a cross-sectional size of the fluid line should decrease from an inflow region towards the opposite end. As a compromise, in other bipolar plates, dimensions of the fluid line are often chosen which are on average too small in the inflow region, ideal in the middle, and too large at the end of the fluid line. As a result, the supply to the cells is not equal along the stacking direction. The cells at the end of the fluid line are usually undersupplied, as a result of which the performance of the electrochemical system at least in this area is not fully exploited. Because the cells are supplied differently with media, the cells in the stack are also subjected to varying degrees of stress. The most stressed cells may exhibit a higher degree of wear and thus fail earlier, which in turn can have a negative effect on the service life of the electrochemical system.

This can be remedied by way of differently sized through-openings of the separator plates and MEAS along the stacking direction or by way of packings that change the hydraulic cross-section. However, differently sized through-openings are not desirable due to the need for structurally identical separator plates and structurally identical MEAS. A filling material or packing is also associated with additional assembly effort and costs, and in addition with a risk of damage to the stack.

The publications US 2011/0165492 A1, US 2012/0070761 A1, US 2016/0013509 A1, DE 10 2016 225 444 A1, DE 10 2017 202 705 A1, US 2009/0081521 A1, EP 1 968 149 A1 likewise deal with the problem described.

Similar structures are also present on separator plates and membranes of humidifiers for electrochemical systems. Therefore, what is stated below can also apply to separator plates of humidifiers. In this embodiment, instead of bipolar plates comprising two separator plates, use may also be made of only single-layer plates, for example separator plates.

The object of the present disclosure is to solve the aforementioned problems at least in part. For instance, it would be desirable if a device can be created in which the electrochemical cells are more equally supplied with media.

This object is achieved by an assembly, a stack and a system according to the independent claims. Further developments form the subject matter of the following description and of the dependent claims.

According to a first aspect of the present disclosure, an assembly for an electrochemical system is proposed. The assembly comprises a first separator plate, a second separator plate, and a membrane electrode assembly, MEA, arranged between the separator plates for forming an electrochemical cell between the separator plates.

The MEA comprises an electrochemically active region and at least one frame-like reinforcing layer surrounding the electrochemically active region. In each case at least one through-opening for the passage of a fluid is formed in the reinforcing layer and in each separator plate, wherein the through-opening of the reinforcing layer and the through-openings of the separator plates are arranged in alignment with one another in order to form a fluid line portion. Alignment of the through-openings means that they form common through-openings, it does not mean that their respective edges in an orthogonal projection into the same plane coincide. The reinforcing layer has at least one flexible tab with a free end for influencing a fluid flow, wherein an orthogonal projection of at least one of the two through-openings of the separator plates onto the reinforcing layer defines a projection area, which at least partially overlaps with the tab.

The assembly may be suitable for use in a stack, in which a plurality of such assemblies are stacked along a stacking direction. In this case, the fluid line portions can form a fluid line. Upon stacking, the flexible tabs can cause a tapering of the cross-section, for instance in an end portion of the fluid line opposite the fluid inflow region, in order to counteract a drop in pressure in the end portion of the fluid line. With the proposed assembly, a drop in pressure along the stacking direction of the fluid line can thus be compensated, so that a supply of media to the individual cells can take place in an equal manner, for example can be kept within a certain tolerance range. In other words, this prevents widely varying concentrations of the media in the cells over at least a portion of the stack or over the entire stack height.

In contrast to other stacks, structurally identical parts can be used over the entire stack in embodiments described herein, both for the separator plates and for the MEAS, respectively.

The aligned arrangement of the through-openings of the separator plates and the at least one through-opening of the reinforcing layer may be meant to form a continuous fluid line section with a sufficiently large flow cross-section. However, the edges of the through-opening of the reinforcing layer and the edges of the through-openings of the separator plate are not congruent. Rather, the edge region around the through-opening of the reinforcing layer often projects at least in sections of the edge, but for instance circumferentially, into the region that results from orthogonal projection of the through-opening of the adjacent separator plate into the plane of the reinforcing layer. In other words, a further orthogonal projection of at least one of the two through-openings of the separator plates onto the reinforcing layer defines a further projection surface which overlaps at least in some regions with the edge region of the through-opening of the reinforcing layer, such as outside a region defined by the tab. Compared with the through-openings of the separator plates, the edge region of the through-opening of the reinforcing layer can thus have an overhang in the region of the overlap. This is also advantageous for avoiding short circuits between the separator plates.

The tab may be designed in such a way that the free end of the tab is deflected or can be deflected out of a plane defined by the reinforcing layer, such as by the action of the fluid flow and/or an external device. For instance, the deflection of the free end may increase as a fluid volume flow and/or a fluid velocity increases. It may be provided that the flexible tab is dimensionally stable and is deflected or can be deflected out of the plane only by the action of the fluid flow and/or an external device. Here, dimensionally stable is intended to mean that the tab, regardless of its orientation, substantially retains its shape when only gravity is acting on the tab. The tab may also be dimensionally unstable, as a result of which the tab is deflected or can be deflected even just under the effect of gravity. An external device for deflecting the tab out of the plane may be part of a stacking device, in which the bipolar plates and MEAs are stacked in an alternating manner. However, it may also be independent of such a stacking device. The device can usually be removed once the stack is complete; upon doing so, in the case of dimensionally stable flexible tabs, the deflection of the respective tab that has been brought about by the external device is retained. In principle, however, it is also possible to leave such an external device in the stack. However, it differs in its structure from the wedge-like elements for adjusting the volume of the fluid line in question; such an external device has a substantially constant cross-section along the stacking direction.

In the embodiment of an external device that does not remain in the stack, it is also possible to open out and fold up the device while guiding it in the fluid line, so that only individual tabs or only tabs in one or more defined portions of the stack are deflected. This therefore results in different flow cross-sections along the stack, despite the use of identical parts.

The first separator plate and the second separator plate define a first plate plane and a second plate plane, respectively. The first plate plane and the second plate plane are usually oriented parallel to one another. The plane defined by the reinforcing layer is usually oriented parallel to the first plate plane and/or parallel to the second plate plane. The aforementioned projection area is usually oriented parallel to the first plate plane, the second plate plane and/or the plane defined by the reinforcing layer.

The reinforcing layer may have a collar which extends around the through-opening of the reinforcing layer. Such a peripheral collar is not to be equated with the flexible tab. However, the tab is for instance connected to the collar, such as at a side of the tab opposite the free end or projects integrally from the collar. The free end usually has greater mobility in relation to the collar, for instance perpendicular to the projection area, but sometimes also in the lateral direction, that is to say parallel to the projection area.

The collar may for example lie at least partially inside the aforementioned projection area. As a result, a cross-sectional area of the fluid line portion in the region of the through-opening of the reinforcing layer is typically smaller than a cross-sectional area of the fluid line portion in the respective region of the through-openings of the separator plates. Alternatively, in the aforementioned orthogonal projection, the edge of the through-opening of the reinforcing layer may coincide at least in part with the edge of the through-opening of one or both of the adjacent separator plates. Alternatively, the collar may lie outside the aforementioned projection area, for example completely outside the projection area. As a result, a cross-sectional area of the fluid line portion in the region of the through-opening of the reinforcing layer is typically larger than a cross-sectional area of the fluid line portion in the respective region of the through-openings of the separator plates. In this case, at least one of the separator plates may be provided at least partially with an electrically insulating coating in the region of the fluid line portion. The risk of a short-circuit between adjacent bipolar plates can thus be reduced.

On the one hand, the shape of the tab generally determines the deflection behavior in relation to the fluid flow. The free end of the tab may have, for example, a tapering shape. In this case, a thickness of the tab and/or of the reinforcing layer is usually substantially constant. In some embodiments, the free end of the tab is semi-circular, rectangular, trapezoidal, crescent-shaped, tongue-shaped, U-shaped or V-shaped. On the other hand, such as in the case of non-round through-openings in the adjoining separator plates, the position of the tab within the through-opening may also influence the deflection behavior in relation to the fluid flow. Due to it being connected by two edges for the same connection length to the rest of the reinforcing edge or the collar thereof, embodiments of a tab arranged in a corner region of such a through-opening will be somewhat more difficult to deflect than a tab connected only at one edge. Furthermore, a tab that has only a short edge in common with the collar, that is to say a short connection length, under otherwise identical conditions is generally easier to deflect than a tab that has a longer edge in common with the collar.

The tab may be designed to be connected to a tab of a further assembly. For instance, the tab may have at least one cutout for receiving a further tab, such as the tab tip, of a further assembly, for example an adjacent assembly. Once the tabs have been connected to one another by deflection, they for instance cannot be detached from one another solely by the fluid flow or by removing the fluid flow. Nevertheless, it is advantageous if mechanical detachment is possible, for example by pulling up using a mechanical device such as a hook.

The frame-like reinforcing layer and the tab may be usually formed of an electrically insulating material. The reinforcing layer may be of single-layer or multi-layer construction. The tab usually has at most the same number of layers as the reinforcing layer. In one embodiment, the tab is formed integrally with the frame-like reinforcing layer, thus as one continuous piece with the reinforcing layer. By way of example, at least one incision or cutout is provided in the reinforcing layer, which incision or cutout laterally delimits the tab or the free end of the tab. Alternatively, the tab and the frame-like reinforcing layer may be separate elements which are connected to one another, for example joined to each other, e.g. by gluing.

According to a further aspect of the present disclosure, a stack for an electrochemical system is provided. The stack comprises a plurality of assemblies of the type described above. The assemblies are stacked along a stacking direction and the fluid line portions thereof form a fluid line. The fluid line portions are thus arranged in alignment with one another so as to form the fluid line.

It may be provided that, for a plurality of assemblies, the respective at least partially deflected tab protrudes into a fluid line portion of at least one adjacent assembly so that the fluid line has a changing cross-sectional area, measured in the region of the through-opening of the MEA or the reinforcing layer thereof, at least in some sections along the stacking direction.

The cross-sectional area is usually oriented parallel to the first plate plane, the second plate plane and/or the plane defined by the reinforcing layer. The cross-sectional area of the fluid line, measured in the region of the through-opening of the reinforcing layer or the MEA, may for example decrease or increase in size in the fluid flow direction. The fluid line may be fluidically connected to a fluid inlet and/or a fluid outlet.

At least in a sub-region of the stack, for instance in entire stacks, all the MEAs and/or all the first separator plates and/or all the second separator plates may be structurally identical. As a result, production of the stack can be made easier, and costs can be lowered.

At least one at least partially deflected tab may bear against an adjacent tab. Furthermore, the at least partially deflected tab may be connected to an adjacent tab in a form-fitting, force-fitting and/or materially bonded manner. This prevents the tab from flapping during operation of the stack.

By way of example, the at least partially deflected tabs may engage in cutouts of adjacent tabs, for instance by latching. Alternatively, an adhesive bonding of adjacent tabs is also possible. In this case, it may be that the adhesive effect is activated when the tabs are in a predetermined position (for example the deflected position), for example via temperature, UV irradiation or moisture. To activate the adhesive bond, a device designed for this purpose, for example a heat lamp, a UV lamp or a moisture dispenser, can be moved through the fluid line. In this embodiment, it is possible in principle to carry out such an activation over the entire stack height, or else only over one or more portions of the stack, for example by switching the device on and off while moving it in the fluid line. In this case, too, different flow cross-sections are obtained along the stack, despite the use of identical parts.

The stack may be further supplemented with a first end plate and a second end plate to form an electrochemical system, wherein the MEAs and the separator plates are arranged between the two end plates. Additional plates, such as in each case exactly one plate similar to the separator plates, may be inserted between the respective last separator plate and the nearest end plate. The first end plate may limit the mobility or deflection of the tabs in the stacking direction. At least one tab adjoining the first end plate may be supported on the end plate. For instance, a plurality of tabs may be supported at least indirectly on the first end plate.

Optionally, the first end plate in the region of the fluid line has a support element for supporting a plurality of tabs and for aiding fluid guidance. The support element may protrude as a protrusion into the fluid line. By virtue of the support element, the tabs can be deflected specifically in the direction of a fluid outlet. The support element and/or the tabs supported thereon may be designed in such a way that they conduct the fluid in the direction of the fluid outlet at least indirectly, for example through the cell.

According to a further aspect, therefore, an electrochemical system is proposed. The electrochemical system comprises a plurality of assemblies of the type described above stacked along a stacking direction and/or the stack of the type described above. The electrochemical system may be a fuel cell system, an electrochemical compressor, an electrolyzer, or a redox flow battery. The assembly and the stack can also be used in a humidifier for an electrochemical system, it being advantageous in the embodiment of a humidifier if the separator plate comprises only one individual plate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Exemplary embodiments of the assembly for an electrochemical system, of the stack and of the electrochemical system are shown in the figures and will be explained in greater detail on the basis of the following description. In the figures:

FIG. 11 schematically shows a section through a stack of a system according to the type of system shown in FIG. 1, according to a further embodiment;

FIG. 14A schematically shows a plan view of a MEA according to a further embodiment;

FIG. 14B schematically shows a section through a stack of a system according to the type of system shown in FIG. 1, according to a further embodiment, comprising the MEAs shown in FIG. 14A;

Here and in the following, features recurring in different figures are in each case denoted by the same or similar reference signs. FIGS. 1-16 are shown approximately to scale. However, large elements may be reduced to fit within the drawings. For instance, in the cross-sections, the cross-sectional areas of openings may be shown in a reduced size relative to the element heights.

DETAILED DESCRIPTION

Figure 1:
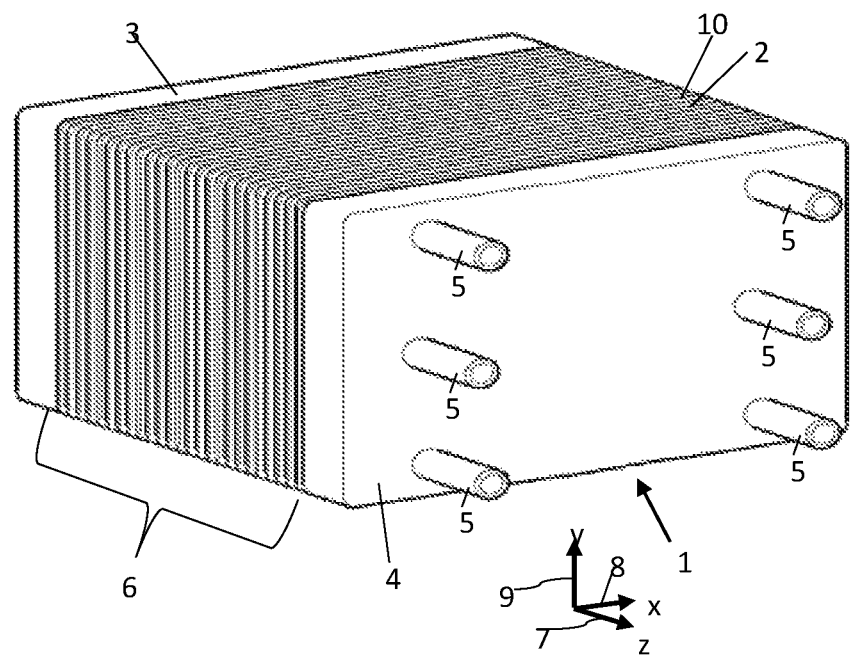
FIG. 1 schematically shows, in a perspective view, an electrochemical system comprising a plurality of separator plates or bipolar plates and electrochemical cells arranged in a stack.

FIG. 1 shows an electrochemical system 1 comprising a plurality of structurally identical metal bipolar plates 2, which are arranged in a stack 6 and are stacked along a z-direction 7. The bipolar plates 2 of the stack 6 are clamped between two end plates 3, 4. The z-direction 7 will also be referred to as the stacking direction. In the present example, the system 1 is a fuel cell stack 6. Each two adjacent bipolar plates 2 of the stack 6 therefore enclose between them an electrochemical cell, which serves for example to convert chemical energy into electrical energy. To form the electrochemical cells of the system 1, a membrane electrode assembly 10 (MEA) is arranged in each case between adjacent bipolar plates 2 of the stack. Each MEA 10 typically contains at least one membrane 14, for example an electrolyte membrane (see for example FIGS. 3B, 4). Furthermore, a gas diffusion layer 16 (GDL) may be arranged on one or both surfaces of the MEA.

In alternative embodiments, the system 1 may also be configured as an electrolyzer, as an electrochemical compressor, or as a redox flow battery. Bipolar plates can likewise be used in these electrochemical systems. The structure of these bipolar plates may then correspond to the structure of the bipolar plates 2 explained in detail here, although the media guided on and/or through the bipolar plates in the case of an electrolyzer, an electrochemical compressor or a redox flow battery may differ in each case from the media used for a fuel cell system.

The z-axis 7, together with an x-axis 8 and a y-axis 9, spans a right-handed Cartesian coordinate system. The bipolar plates 2 and the separator plates 2a, 2b forming these (see FIG. 2 and FIG. 4) each define a plate plane, each of the plate planes of the separator plates being oriented parallel to the x-y plane and thus perpendicular to the stacking direction or to the z-axis 7. The MEAS are also each arranged parallel to the x-y plane. The end plate 4 has a plurality of media ports 5, via which media can be fed to the system 1 and via which media can be discharged from the system 1. Said media that can be fed to the system 1 and discharged from the system 1 may comprise for example fuels such as molecular hydrogen or methanol, reaction gases such as air or oxygen, reaction products such as water vapor or depleted fuels, or coolants such as water and/or glycol.

Figure 2:
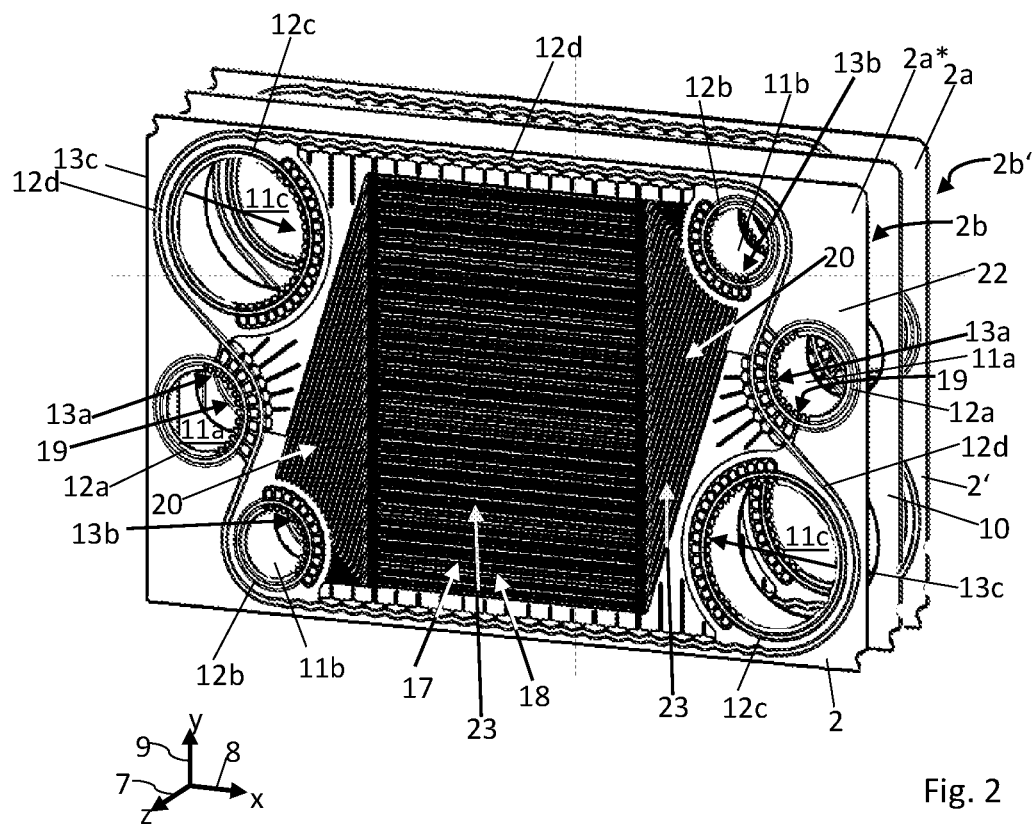
FIG. 2 schematically shows, in a perspective view, two bipolar plates of the system shown in FIG. 1 with a membrane electrode assembly (MEA) arranged between the bipolar plates.

FIG. 2 shows, in a perspective view, two adjacent bipolar plates 2, 2' of an electrochemical system of the same type as the system 1 from FIG. 1, as well as a membrane electrode assembly (MEA) 10 which is arranged between these adjacent bipolar plates 2, the MEA 10 in FIG. 2 being largely obscured by the bipolar plate 2 facing towards the viewer. The respective bipolar plate is formed of two separator plates which are joined together in a materially bonded manner (see for example FIG. 4). In the bipolar plate 2' facing away from the viewer, these are the separator plates 2a and 2b'; in the bipolar plate 2 facing towards the viewer, these are the separator plates 2a* and 2b. The designations 2a* and 2b' are used in the present FIG. 2 to emphasize which separator plates 2a and 2b of the MEA are facing away; however, these correspond in terms of their structure to the separator plates 2a and 2b. In the embodiment of FIG. 2, in each case only the first separator plate 2a* or 2a facing towards the viewer is visible, said first separator plate hiding the second separator plate 2b or 2b*. The separator plates 2a*, 2b, 2a, 2b' may each be manufactured from a metal sheet, for example from a stainless-steel sheet. The separator plates 2a* and 2b and respectively 2a and 2b' may for example be welded to one another, for example by laser-welded joints. Adhesive bonds or soldered joints are likewise possible. Regardless of this bonding, it is the separator plates 2a and 2b that enclose the MEA 10 between them.

The separator plates 2a*, 2b have through-openings, which are aligned with one another and form through-openings 11a-c of the bipolar plate 2. Alignment of the through-openings means that they form common through-openings, it does not mean that their respective edges in an orthogonal projection into the same plane must coincide. When a plurality of bipolar plates of the same type as the bipolar plate 2 are stacked, the through-openings 11a-c form fluid lines 25 which extend through the stack 6 in the stacking direction 7 (see FIG. 1). Typically, each of the fluid lines 25 formed by the through-openings 11a-c is fluidically connected to one of the ports 5 in the end plate 4 of the system 1. For example, coolant can be introduced into the stack 6 or discharged from the stack 6 via the fluid lines 25 formed by the through-openings 11a. In contrast, the fluid lines 25 formed by the through-openings 11b, 11c may be configured to supply fuel and reaction gas to the electrochemical cells of the fuel cell stack 6 of the system 1 and to discharge the reaction products from the stack 6. The media-guiding through-openings 11a-11c are substantially parallel to the plate plane of the bipolar plate 2.

In order to seal off the through-openings 11a-c with respect to the interior of the stack 6 and with respect to the surrounding environment, embodiments of the first separator plates 2a, as can be seen here on the basis of the separator plate 2a*, may often each have sealing arrangements in the form of sealing beads 12a-c, which are in each case arranged around the through-openings 11a-c and in each case completely surround the through-openings 11a-c. On the rear side of the bipolar plates 2, facing away from the viewer of FIG. 2, the second separator plates 2b usually have corresponding sealing beads for sealing off the through-openings 11a-c (not shown).

In an electrochemically active region 18, the first separator plates 2a*, 2a usually have, on the front side thereof facing towards the viewer of FIG. 2, a flow field 17 with structures for guiding a medium along the front side of the separator plate 2a*, 2a. In FIG. 2, these structures are defined by a plurality of webs and channels extending between the webs and delimited by the webs. On the front side of the bipolar plates 2, 2', facing towards the viewer of FIG. 2, the first separator plates 2a*, 2a additionally each have a distribution or collection region 20. The distribution or collection region 20 comprises structures which are configured to distribute over the active region 18 a medium that is introduced into the distribution or collection region 20 from a first of the two through-openings 11b, and/or to collect or to pool a medium flowing towards the second of the through-openings 11b from the active region 18. In FIG. 2, the distributing structures of the distribution or collection region 20 are likewise defined by webs and channels extending between the webs and delimited by the webs. In general, the elements 17, 18, 20 can be understood as media-guiding embossed structures.

The sealing beads 12a-12c often have passages 13a-13c, which are embodied here as local elevations and cutouts in the bead, of which the passages 13a are formed both on the underside of the upper separator plate 2a* or 2a and on the upper side of the lower separator plate 2b, while the passages 13b are formed in the upper separator plate 2a* or 2a and the passages 13c are formed in the lower separator plate 2b. By way of example, the passages 13a enable coolant to pass between the through-opening 12a and the distribution region, so that the coolant enters the distribution region between the separator plates and is guided out therefrom. Furthermore, the passages 13b enable hydrogen to pass between the through-opening 12b and the distribution region on the upper side of the upper separator plate 2a* or 2a; these passages 13b are characterized by perforations facing towards the distribution region and extending at an angle to the plate plane. By way of example, hydrogen thus flows through the passages 13b from the through-opening 12b to the distribution region on the upper side of the upper separator plate 2a* or 2a, or in the opposite direction. The passages 13c enable air, for example, to pass between the through-opening 12c and the distribution region, so that air enters the distribution region on the underside of the lower separator plate 2b and is guided out therefrom. The associated perforations are not visible here.

The first separator plates 2a usually each also have a further sealing arrangement in the form of a perimeter bead 12d, which extends around the flow field 17 of the active region 18 and also around the distribution or collection region 20 and the through-openings 11b, 11c and seals these off with respect to the through-opening 11a, that is to say with respect to the coolant circuit, and with respect to the environment surrounding the system 1. The second separator plates 2b each comprise corresponding perimeter beads. The structures of the active region 18, the distributing structures of the distribution or collection region 20 and the sealing beads 12a-d are each formed in one piece with the separator plates 2a and are integrally formed in the separator plates 2a, for example in an embossing or deep-drawing process. which may be accompanied by at least one cutting process. The same applies to the corresponding distributing structures and sealing beads of the second separator plates 2b. Outside the region surrounded by the perimeter bead 12d, an outer edge region 22 is formed in each separator plate 2a, 2b, in which usually no fluid guidance takes place.

The two through-openings 11b or the fluid lines 25 through the stack 6 of the system 1 that are formed by the through-openings 11b are each fluidically connected to one another via passages 13b in the sealing beads 12b, via the distributing structures of the distribution or collection region 20 and via the flow field 17 in the active region 18 of the first separator plates 2a* or 2a facing towards the viewer of FIG. 2. Analogously, the two through-openings 11c or the lines through the stack of the system 1 that are formed by the through-openings 11c are each fluidically connected to one another via corresponding bead passages, via corresponding distributing structures and via a corresponding flow field on an outer side of the second separator plates 2b facing away from the viewer of FIG. 2. In contrast, the through-openings 11a or the lines through the stack of the system 1 that are formed by the through-openings 11a are each fluidically connected to one another via a cavity 19 that is enclosed or surrounded by the separator plates 2a*, 2b and 2a, 2b', respectively. This cavity 19 serves in each case to guide a coolant through the bipolar plate 2, 2', such as for cooling the electrochemically active region 18 of the bipolar plate 2, 2'.

It should be noted here that, instead of the bead arrangements 12*a-d*, elastomeric sealing lips may also be provided, which may be arranged in depressions of the separator plate. The course of these sealing lips and optionally of the depressions may be substantially the same as the course of the bead arrangements 12*a-d* shown in the figures, but locally undulating courses are usually omitted. In the following, the bead arrangements 12*a*-12*d* and the depressions/sealing lips will be referred to in general as sealing elements. As will be shown below, it is not necessary for the sealing elements to be formed on sides of the separator plates in the same way as the sealing elements mentioned above; it is equally possible for the sealing elements 120 to be applied to the reinforcing edge of the MEA.

Figure 3A:
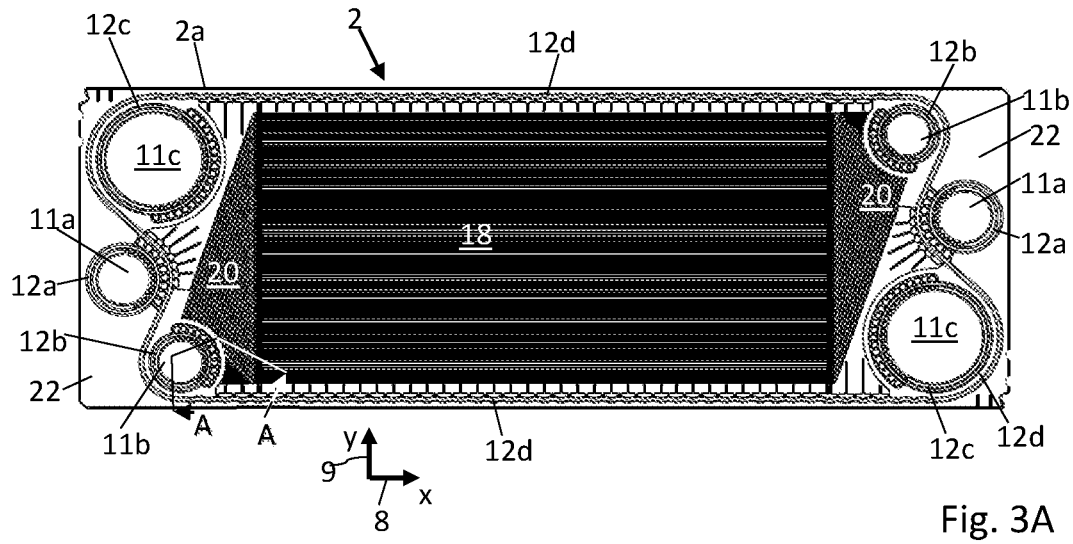
FIG. 3A schematically shows a plan view of a bipolar plate.

FIG. 3A shows a plan view of a bipolar plate 2, the viewing direction being oriented along the negative z-direction 7. The bipolar plate 2 shown in FIG. 3A may have all the features of the bipolar plates 2 shown in FIGS. 1 and 2. Like the bipolar plates 2 shown in FIGS. 1 and 2, the bipolar plate 2 shown in FIG. 3A thus comprises two separator plates or metal sheets 2*a*, 2*b*. The separator plates or metal sheets 2*a*, 2*b* are in contact with one another along their mutually facing flat sides and are connected to one another along their mutually facing flat sides. For instance, the metal sheets 2*a*, 2*b* of the bipolar plate 2 are connected to one another in a materially bonded manner, such as by one or more welded joints, for example by one or more laser-welded joints. Soldered joints or adhesive bonds are also possible as an alternative. In a manner corresponding to the bipolar plates 2 shown in FIGS. 1 and 2, the bipolar plate 2 shown in FIG. 3A may have through-openings 11*a-c*, bead arrangements 12*a-d*, an electrochemically active region 18, at least one distribution or collection region 20, and an outer edge region 22.

Figure 3B:
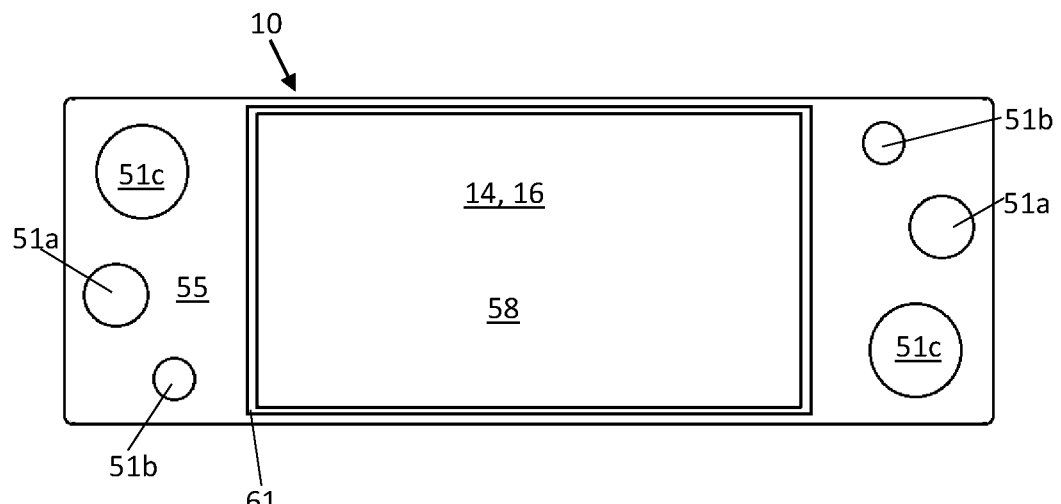
FIG. 3B schematically shows a plan view of a MEA adjoining the bipolar plate shown in FIG. 3A.

FIG. 3B shows a plan view of an MEA 10, which can be used together with the bipolar plate 2 of FIG. 3A in the stack 6 of FIG. 1. The MEA has through-openings 51*a*, 51*b*, 51*c*, which are respectively aligned with the through-openings 11*a*, 11*b*, 11*c*.

The MEA 10 typically comprises a membrane 14, for example an electrolyte membrane, and an edge portion 55 which is connected to the membrane 14 and which is often referred to as a reinforcing layer 55 or frame-like reinforcing layer 55. By way of example, the reinforcing layer 55 may be connected to the membrane 14 by joining, for example by an adhesive bond or by lamination. Also shown in FIG. 3B is an electrochemically active region 58 of the MEA, which is brought into congruence with the electrochemically active region 18 of the bipolar plate 2 when the MEA 10 and the bipolar plate 2 are stacked. The membrane 14 and the two gas diffusion layers 16 extend over the electrochemically active region 58 of the MEA 10. The frame-like reinforcing layer 55, the membrane 14 and the gas diffusion layers 16 typically overlap in an overlap region 61.

Figure 4:
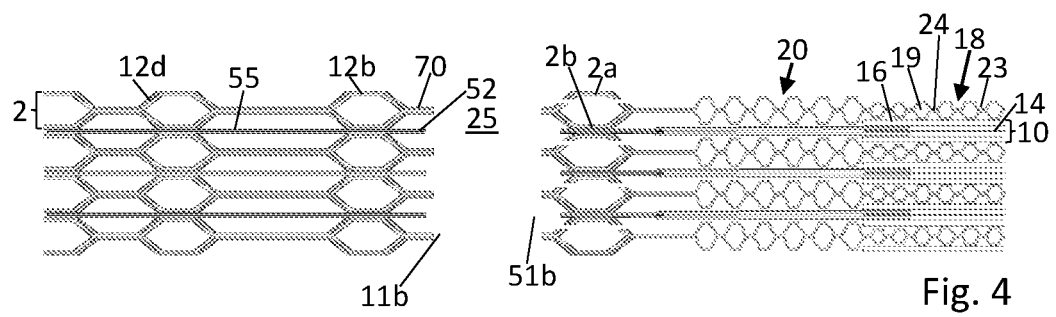
FIG. 4 schematically shows a section through a stack of a system according to the type of system shown in FIG. 1, along the section line A-A shown in FIG. 3A.

FIG. 4 schematically shows a section through a portion of the plate stack 6 of the system 1 from FIG. 1, the section plane being oriented in the z-direction and thus perpendicular to the plate planes of the bipolar plates 2.

It may extend, for example, along the angled section A-A of the bipolar plate 2 shown in FIG. 3A.

The structurally identical bipolar plates 2 of the stack 6 each comprise one of the above-described first metal separator plates 2*a* and one of the above-described second metal separator plates 2*b*. Structures for guiding media along the outer faces of the bipolar plates 2 are visible, here such as in the form of webs and channels delimited by the webs. For instance, channels 23 are shown on the surfaces of adjoining separator plates 2*a*, 2*b* that point away from one another, and cooling channels 19 are shown between adjoining separator plates 2*a*, 2*b*. Between the cooling channels 19, the two separator plates 2*a*, 2*b* rest against one another in a contact region 24 and are connected to one another there, in the present example by means of laser welds.

A membrane electrode assembly (MEA) 10 for example the MEA of FIG. 3B, is arranged in each case between adjacent bipolar plates 2 of the stack 6.

The membrane 14 of the MEA 10 extends in each case at least over the active region 18 of the adjoining bipolar plates 2 and there enables a proton transfer via or through the membrane 14. The reinforcing layer 55 of the MEA 10 serves in each case for positioning, attaching and sealing off the membrane 14 between the adjoining separator plates 2*a*, 2*b*. When the bipolar plates 2 are clamped in the stacking direction between the end plates 3, 4 of the system 1 (see FIG. 1), the frame-like reinforcing layer 55 of the MEA 10 can for example be compressed in each case between the sealing beads 12*a-d* of the respectively adjoining separator plates 2*a*, 2*b* and/or in each case at least between the perimeter beads 12*d* of the adjoining bipolar plates 2, in order to fix the membrane 14 between the adjoining bipolar plates 2 in this way.

The edge portion or the reinforcing layer 55 often covers the distribution or collection region 20 of the adjoining bipolar plates 2. Towards the outside, the reinforcing layer 55 may also extend beyond the perimeter bead 12*d* and may at that point adjoin the outer edge region 22 of the separator plates 2*a*, 2*b* (cf. FIG. 2).

The gas diffusion layers 16 already mentioned above may also be arranged in the active region 18. The gas diffusion layers 16 enable a flow across the membrane 14 over the largest possible area of the surface of the membrane 14 and can thus improve the proton transfer via the membrane 14. The gas diffusion layers 16 may for example be arranged on each side of the membrane 14 in the active region 18 between the adjoining separator plates 2*a*, 2*b*.

Figure 5B:
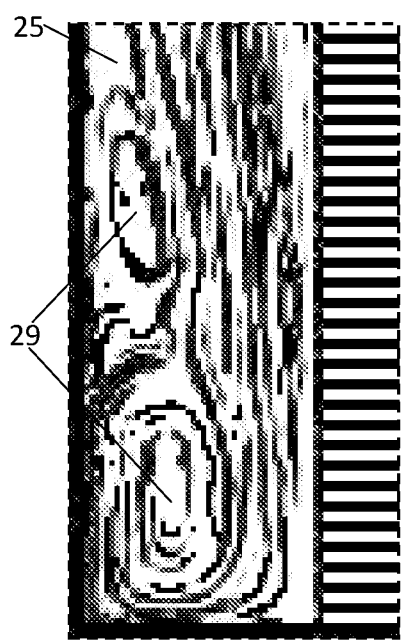
FIG. 5B shows an enlargement of a detail from FIG. 5A.
Figure 5A:
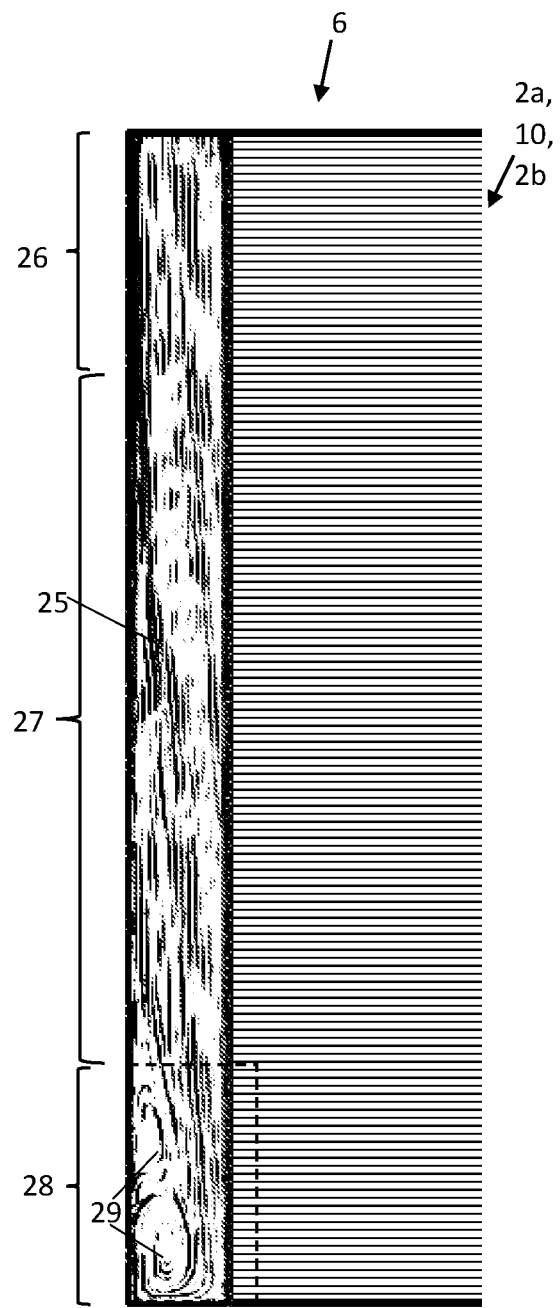
FIG. 5A schematically shows a longitudinal section through a stack of a system according to the type of system shown in FIG. 1.

FIG. 5A shows a longitudinal section parallel to the z-x plane through a sub-region of the stack 6 in a simulated operating state of the system 1. It can be seen that a gaseous or liquid medium fills the fluid line 25, for instance flows through the latter. Depending on the fluid, the fluid line 25 may be formed by a plurality of aligned through-openings 11*a*, 11*b* or 11*c*. The fluid line 25 comprises a first end portion 26, a middle portion 27 and a second end portion 28, which are fluidically connected to one another and are connected in series. The first end portion 26 is connected to a media port 5 configured as a fluid inlet and can thus be understood as a fluid inflow region 26. The second end portion 28 of the fluid line 25 typically adjoins the first end plate 3 of the stack 6 (see also FIG. 12). From the fluid line 25, the fluid enters the electrochemical cells (not shown) spanning the fluid line over the entire length thereof, that is to say in each of the portions 26, 27, 28 of the fluid line 25. FIG. 5B shows an enlargement of a detail from FIG. 5A in the region of the second end portion 28.

In the region of the through-openings 11*a-c* formed by the separator plates 2*a*, 2*b*, the fluid line 25 has a cross-sectional area that extends parallel to the plate planes of the separator plates 2*a*, 2*b* (cf. also FIG. 4). The cross-sectional area of the fluid line 25 is constant at spatial intervals along the stacking direction in the region of the through-openings 11*a-c*. Between two adjacent bipolar plates 2, the cross-sectional area of the fluid line 25 increases in size somewhat, a size of the cross-sectional area having a local minimum in the region of the reinforcing layer 55, that is to say in the middle between two adjacent bipolar plates 2, see also FIG. 4. The cross-sectional area of the fluid line 25 is also constant in the region of the through-openings 51a-c of the reinforcing layer 55, cf. also FIG. 4. In other words, the fluid line 25 typically has in the stacking direction a periodically constant cross-sectional size and shape, the spatial period corresponding to the size of the electrochemical cell (including the separator plates 2a, 2b) in the z-direction.

In FIGS. 5A, 5B, it can be seen from the flow lines shown in the fluid line 25 that fluid vortices 29 are formed in the second end portion 28 due to a drop in pressure and/or a drop in velocity of the fluid flowing in the fluid line 25, whereas the flow in the first end portion 26 and in the middle portion 27 is substantially laminar. The performance of the respective electrochemical cell of the stack 6 is thus location-dependent and usually decreases steadily in the direction from the fluid inlet region 26 to the end region 28. The electrochemical cells located at the end portion 28 are usually undersupplied due to a drop in pressure along the stacking direction, while a fluid pressure or a fluid velocity is often too high for the electrochemical cells located at the inflow region 26 in relation to the stacking direction. Due to the fact that structurally identical bipolar plates 2 and MEAs 10 are used, a compromise must be found for the supply of media or cooling fluid to the electrochemical cells. Usually, the fluid line 25 is optimized for a supply of media or cooling fluid to electrochemical cells located in the middle portion 27.

The present disclosure has been devised to reduce location-dependent fluctuations in performance of the electrochemical cells in the stack 6 and to increase the efficiency of the (partial) stack 6 of electrochemical cells adjoining the second end region 28. The stack 6, in which the end region 28 of the fluid line 25 is spanned, represents a portion of the entire stack of the electrochemical system, but can also be considered a stack 6 in itself.

The present disclosure proposes an assembly 30 for a stack 6 or for an electrochemical system 1, such as the electrochemical system 1 shown in FIG. 1.

Figure 6A:
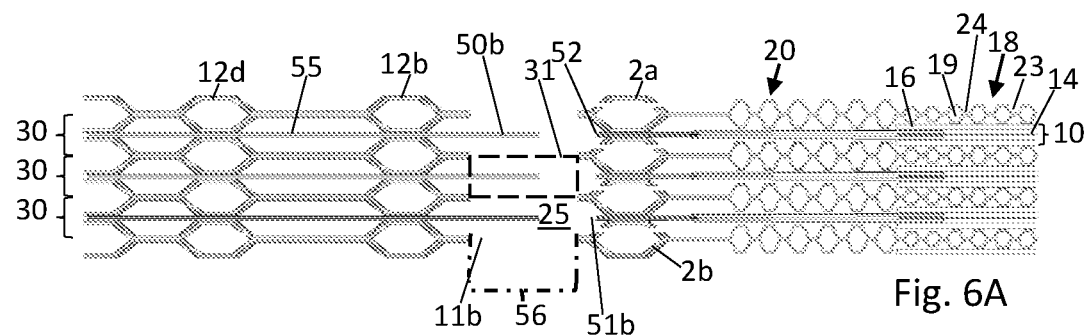
FIG. 6A schematically shows a section through a stack of a system according to the type of system shown in FIG. 1, along a section line analogous to the section line A-A shown in FIG. 3A, according to one embodiment.

FIG. 6A schematically shows a section through a stack of a system according to the type of system shown in FIG. 1, the stack 6 comprising a plurality of stacked assemblies 30 according to one embodiment. While FIG. 6A shows a plate stack 6 exhibiting three assemblies 30 as well as portions of two further assemblies 30 at the top and at the bottom, electrochemical systems 1 usually comprise more than 100, often even more than 300 such assemblies 30. In the context of this present disclosure, therefore, a stack may be a partial stack as shown in FIG. 6A or a complete stack of an electrochemical system.

Each assembly 30 may comprise the above-described elements 2a, 2b (separator plates), and 55 (reinforcing layer), an electrochemical cell being formed between the separator plates 2a, 2b. As described above, in each case at least one through-opening 51b, 11b for the passage of a fluid is formed in the reinforcing layer 55 and in each separator plate 2a, 2b. The through-opening 51b of the reinforcing layer 55 and the through-openings 11b of the separator plates 2a, 2b are arranged in alignment with one another so as to form a fluid line portion 31. The aligned fluid line portions 31 of the assemblies 30 in turn form the fluid line 25. To illustrate the difference between 25 and 31, based on the example of one assembly 30, the area of the associated fluid line portion 31 is delimited by a dashed line.

As an addition to the reinforcing layers 55 shown in FIGS. 2, 3B, 4, 5A, the reinforcing layer 55 of the MEA 10 shown in FIG. 6A has at least one flexible tab 50b with a free end for influencing a fluid flow. Here, an orthogonal projection of at least one of the two through-openings 11b of the separator plates 2a, 2b onto the reinforcing layer 55 defines a projection area 56, which at least partially overlaps with the tab 50b. In some embodiments, the tab 50b lies entirely inside the projection area 56. In other words, in this orthogonal projection, the tab 50b protrudes laterally into the fluid line portion 31 formed by the through-openings 11b, or into the fluid line 25.

Like the reinforcing layer of FIG. 4, the reinforcing layer 55 may have a collar 52 which extends around the through-opening 51b of the reinforcing layer 55. The part of the reinforcing layer 55 defined by the peripheral collar 52 may be laterally delimited by the adjoining sealing elements 12b of the separator plates 2a, 2b. The tab 50b is connected to the collar 52 on a side opposite its free end. In FIG. 6A, the collar 52 surrounds the aforementioned projection area 56 and lies outside the projection area 56. This embodiment may be suitable if not only do the sealing beads 12b have an electrically insulating coating 70, but rather the entire area of the separator plates, from the inner edge to the end of the bead pointing away therefrom, has an electrically insulating coating 70, so that no short-circuit can occur between adjacent bipolar plates 2. As an alternative, it may be provided that the collar 52 lies partially inside the projection area 56, cf. the embodiment of FIG. 11.

The reinforcing layer 55 including the tab 50b is usually made of an electrically insulating material. The reinforcing layer 55 may in this case be of single-layer or multi-layer construction. If multiple layers are provided, these may for example be adhesively bonded or laminated to one another. The tab 50b usually has at most the same number of layers as the reinforcing layer 55. In one such embodiment, the tab 50b is formed integrally with the reinforcing layer 55, for example with at least one of the layers of the reinforcing layer 55. Alternatively, the tab 50b and the reinforcing layer 55 may be separate elements, which are connected to one another for example in a materially bonded manner, such as by means of an adhesive bond. The reinforcing layer 55 and the tab 50b may have a constant thickness.

FIG. 6A shows a state of the system 1 in which the dimensionally stable tabs 50b still extend parallel to the plate planes. The flexible tab 50b may be designed in such a way that the free end is deflected or can be deflected out of a plane E defined by the reinforcing layer 55, such as by the action of the fluid flow and/or an external device. In FIG. 6A, the dimensionally stable flexible tabs 50b are not yet deflected; however, tabs 50 that have been deflected in this way can be seen for example in FIG. 11. Instead of dimensionally stable tabs 50b, dimensionally unstable tabs can also be used.

Figure 6B:
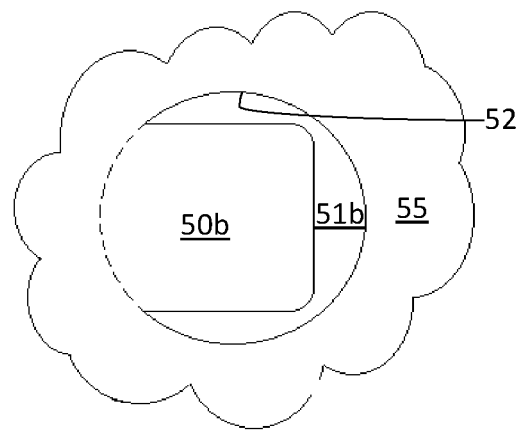
FIG. 6B schematically shows a plan view of a MEA that can be used in the stack of FIG. 6A.
Figure 7:
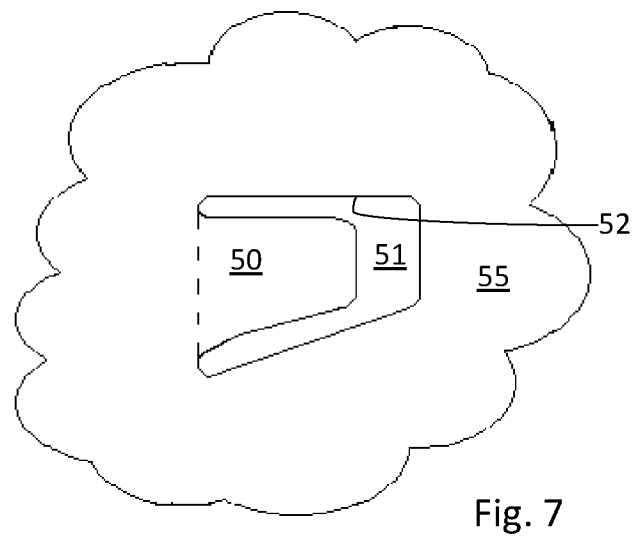
FIG. 7 schematically shows a plan view of a MEA according to a further embodiment.

Although reference is made in FIGS. 6A, 6B to the through-openings 51b, 11b and the tab 50b, the tab may also be provided in the region of the through-openings 11a, 11c or 51a, 51c. To illustrate that the tab is not limited to a specific through-opening 11a, 11b, 11c of the separator plates 2a, 2b or to a specific through-opening 51a, 51b, 51c of the MEA 10, reference will be made below and in FIGS. 7-16 more generally to the tab 50 and the through-openings 11, 51. As in FIG. 4, the separator plates 2a, 2b in FIG. 6A are provided with an electrically insulating coating 70 in some regions.

The tab 50 may be formed together with the through-opening 51 by being punched or cut out from the reinforcing layer 55. For instance, at least one incision or one cutout may be provided in the reinforcing layer 55, which incision or cutout laterally delimits the tab 50 or the free end of the tab 50.

The free end of the tab 50 may have different shapes, cf. FIGS. 6B-10. For instance, the free end may have a tapering shape, while the thickness remains constant. For instance, the free end of the tab 50 may be semicircular, rectangular, U-shaped (cf. FIG. 6B), trapezoidal (cf. FIG. 7), tongue-shaped (cf. FIG. 8), crescent-shaped (cf. FIG. 9) or V-shaped (cf. FIG. 10).

Figure 10:
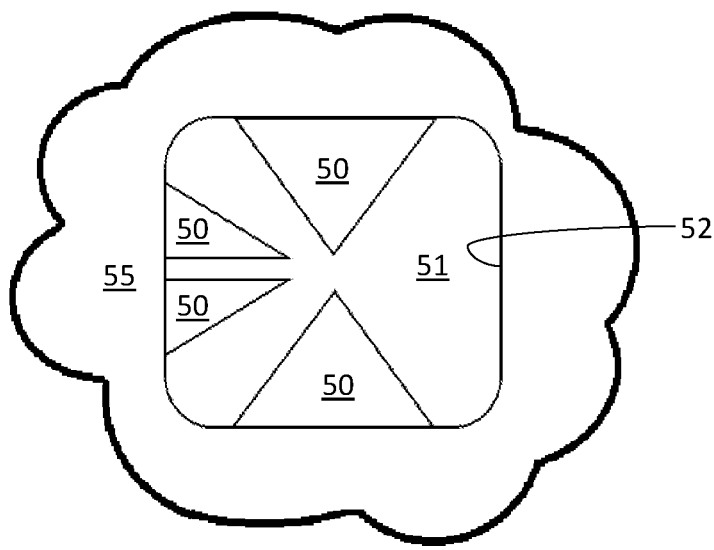
FIG. 10 schematically shows a plan view of a MEA according to a further embodiment.

Apart from the shape of the tab 50, the reinforcing layer 55 of FIG. 10 differs from the reinforcing layers 55 of FIGS. 6B-9 also by the fact that four tabs 50 are provided instead of just one tab 50. The number of tabs 50 may also be less than or more than four. If two or more tabs 50 are provided, these may have different or identical shapes. It is also possible that, if multiple tabs 50 are present in a fluid line 25 and a reinforcing layer 55, one or more, but not all, of these tabs 50 are connected/become connected to corresponding tabs of adjacent reinforcing layers 55 in a form-fitting manner (cf. FIGS. 14A, 14B) and/or by joining, for example by means of an adhesive that has to be activated, while one or more, but not all, of these tabs 50 are not connected/do not remain connected to corresponding tabs of adjacent reinforcing layers 55.

Figure 8:
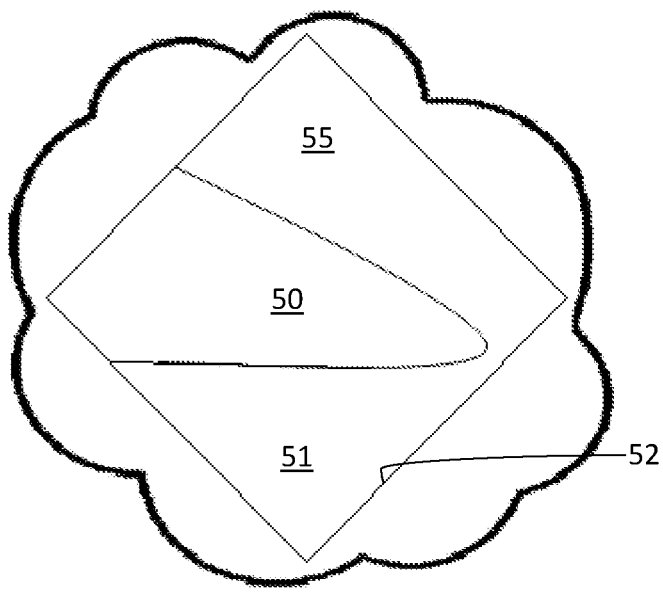
FIG. 8 schematically shows a plan view of a MEA according to a further embodiment.
Figure 9:
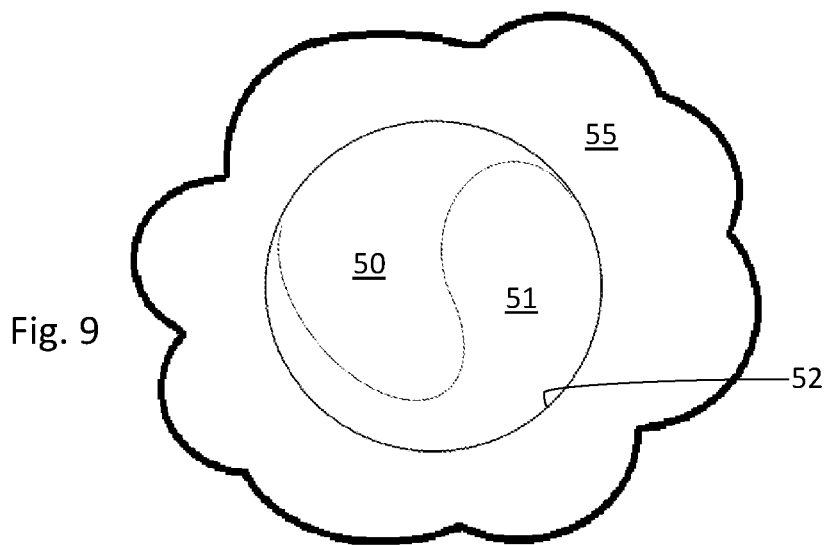
FIG. 9 schematically shows a plan view of a MEA according to a further embodiment.

Also in the connection region, the common edge of the collar 52 and the tab 50 may be designed differently between different embodiments, for example may have a different length or undergo a different connection, for example in the form of a straight common edge (FIGS. 6B, 7, 10) or a round common edge (FIG. 9) or an angled common edge (FIG. 8). The latter is synonymous with a connection to multiple, such as two, collar sides, for instance in the case of a polygonal collar shape.

The free end of the tab 50 has greater mobility in relation to the collar 52, for instance perpendicular to the projection area 56, sometimes also in the lateral direction, that is to say parallel to the projection area 56. For this reason, the tab 50 can be deflected out of the plane E, which will be explained in greater detail on the basis of FIGS. 11-16. With some tab shapes, it is not the entire tab that is deflected. The bending line does not always coincide with the transition line between collar and tab, e.g. the transition line may be curved while the bending line is straight.

For instance, it can be seen in FIG. 11 that the tab 50 is deflected out of the plane E of the reinforcing layer. As a result, the tab 50 is arranged at an angle—that is to say not parallel—to the plane E. The tab 50 that has been deflected out of the plane E can engage through the through-openings 11 of one of the separator plates 2a, 2b of its own assembly 30. Furthermore, the tab 50 can protrude into a fluid line portion 31 of an adjacent assembly 30. Optionally, the tab 50 may even engage in at least one of the through-openings 11, 51 of the adjacent assembly 30 (cf. FIG. 11). It is also possible that the tab not only protrudes into the fluid line portion 31 of the adjacent assembly, but rather protrudes through it and extends over the height of multiple fluid line portions 31, for example in the fully deflected state the tab 50 extends over the height of more than 15 or even more than 25 fluid line portions 31.

It may optionally be provided that the collar 52 lies at least partially inside the projection area 56 (cf. FIG. 11). In this case, a cross-sectional area of the fluid line 25 in the region of the through-opening 51 of the reinforcing layer 55 may be smaller than a cross-sectional area of the fluid line 25 in the respective region of the through-openings 11 of the separator plates 2a, 2b. Here, the cross-sectional area is usually oriented parallel to the first plate plane, the second plate plane and/or the plane E defined by the reinforcing layer 55. For instance, when the collar 52 protrudes into the projection area 56 all the way round, this prevents a short circuit between adjacent bipolar plates. In this case, there is no need for an electrically insulating coating in the region around the through-opening 11 of the separator plate 2a, 2b.

FIG. 11 differs from the other embodiments also in that the assembly is sealed off not by means of one or more sealing element(s) integrally formed in the bipolar plates, namely sealing beads 12, but rather by means of elastomeric beads 12' applied to both sides of the reinforcing layer 55'.

Figure 12:
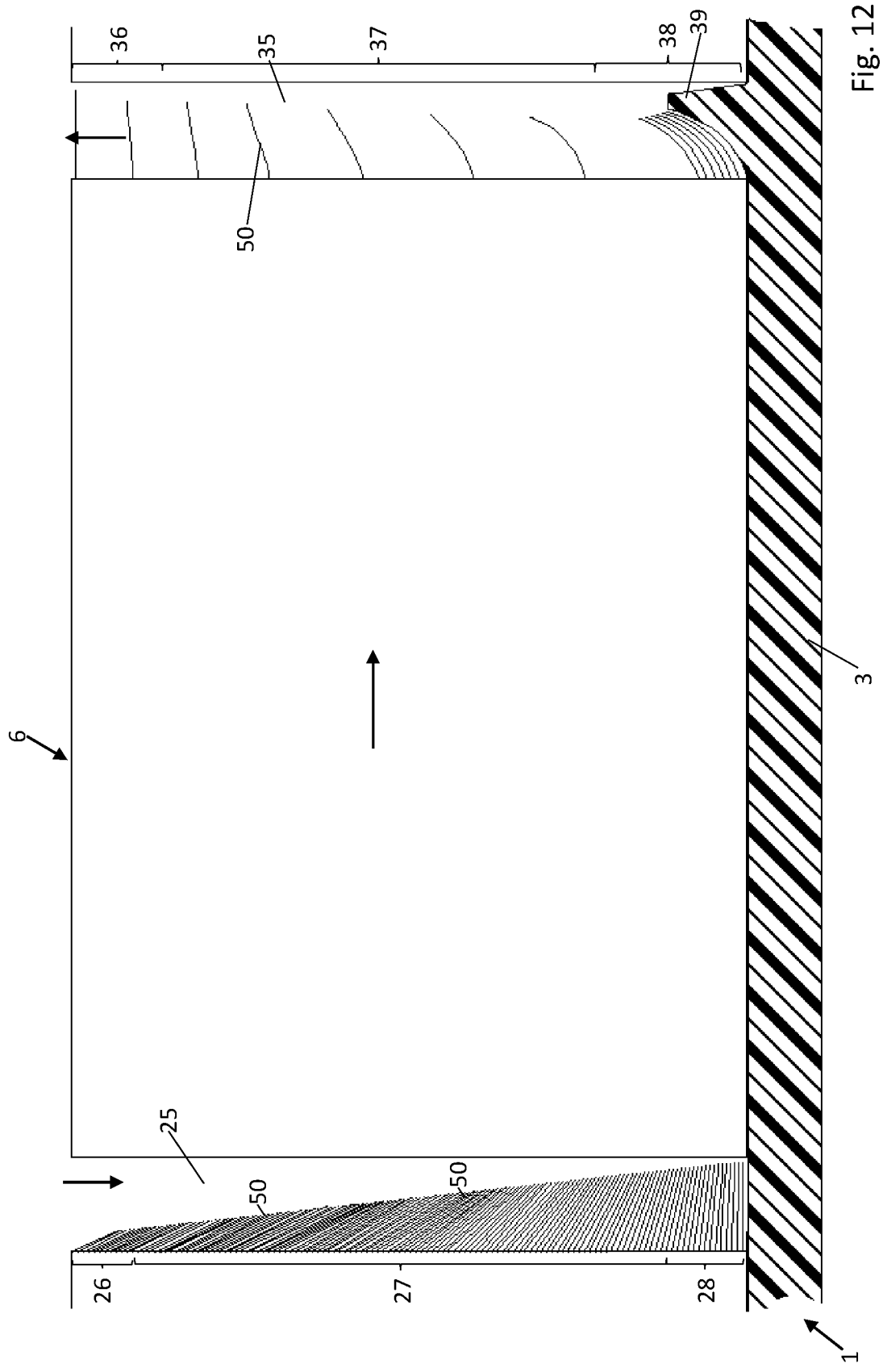
FIG. 12 schematically shows a longitudinal section through a stack of a system according to the type of system shown in FIG. 1, according to one embodiment.

In a manner similar to FIG. 5A, FIG. 12 shows a longitudinal section parallel to the z-x plane through a sub-region of the stack 6 according to one embodiment. As already described above, the electrochemical system 1 comprises, in addition to the complete stack 6, a first end plate 3 and a second end plate 4 (not shown in FIG. 12), wherein the MEAs 10 and the separator plates 2a, 2b or the assemblies 30 are arranged between the two end plates 3, 4. FIG. 12 is a highly schematic representation; for instance, the tabs 50 are not shown to scale; further details of the electrochemical cells and separator plates are not shown.

The portion of the electrochemical system 1 shown in FIG. 12 is in a rest state, that is to say no fluid is flowing in the stack 6. For clarity, a flow direction of the fluid is indicated by arrows in FIG. 12. The fluid line 25 shown in FIG. 12 is designed to admit media, such as methanol, hydrogen, air or coolant. As already explained in connection with FIG. 5A, the fluid line 25 comprises the first end portion 26, the middle portion 27 and the second end portion 28, which are fluidically connected to one another. The first end portion 26 is connected to a media port 5 of the second end plate 4 (not shown in FIG. 12) configured as a fluid inlet and can thus be understood as a fluid inflow region 26.

The second end portion 28 of the fluid line 25 adjoins the first end plate 3 and is closed by the end plate 3 in a fluid-tight manner. Embodiments of the end plate 3 directly limit a mobility or deflection of the adjoining flexible tab 50 in the stacking direction (z-direction) and can prevent the tab 50 adjoining the end plate 3 from being deflected out of the plane E of the reinforcing layer 55. As indicated in FIG. 12, during operation of the stack 6, a plurality of tabs 50 at least in the second end region 28 can be supported at least indirectly on the end plate 3. As a result, the tabs 50 in the fluid inflow region 26 are deflected further out of their respective plane E than the tabs 50 in the second end portion 28.

Due to the tabs 50 deflected out of the planes E in the first end portion 26 on the one hand and the tabs 50 supported by the end plate 3 in the end portion 28 on the other hand, a size of the cross-sectional area of the fluid line 25 in the region of the through-openings 11 and/or the through-openings 51 decreases over the course of the fluid line 25, that is to say between the start of the inflow region 26 and the opposite end of the second end portion 28 in the fluid flow direction.

Figures 13A, 13B:
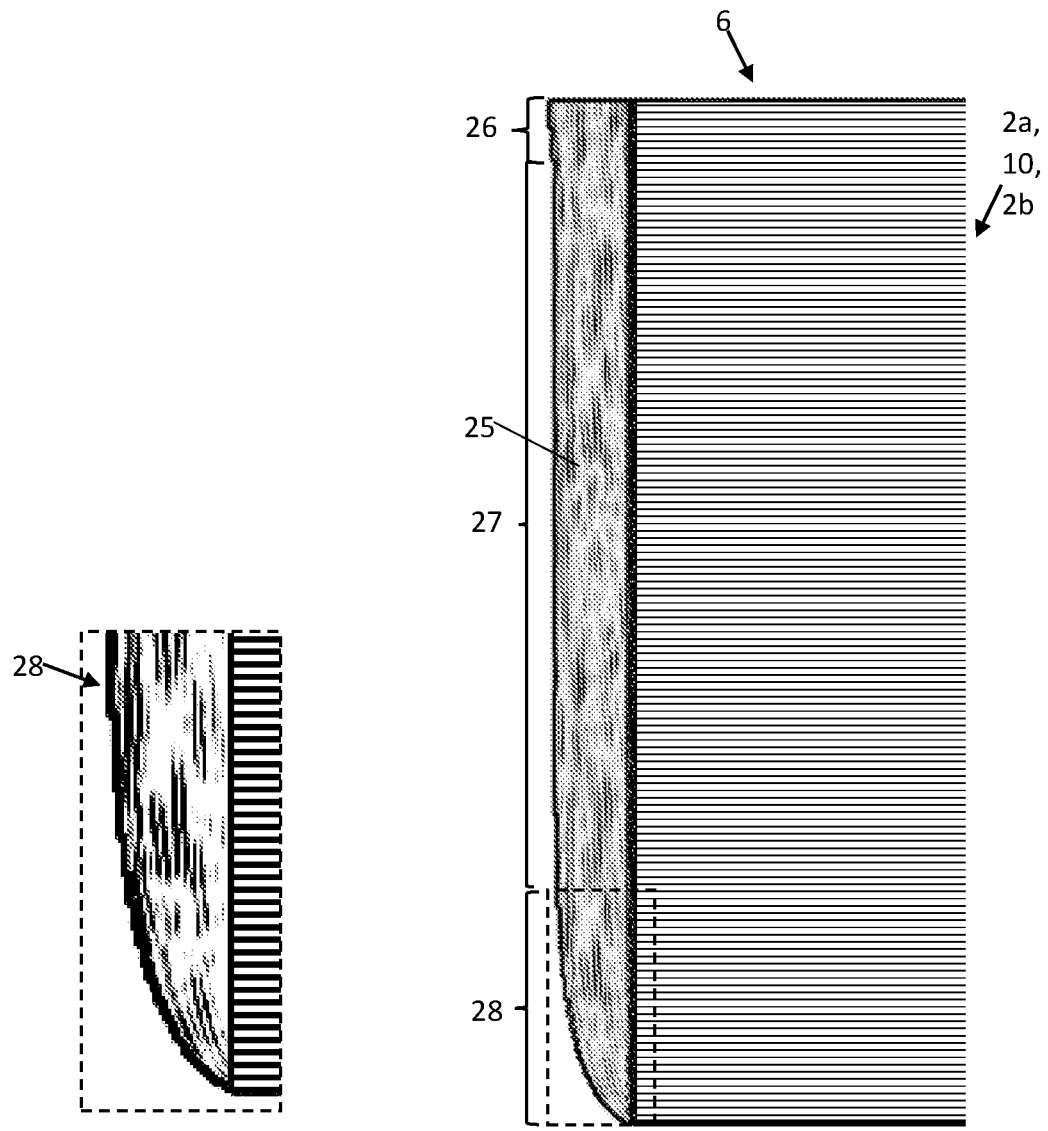
FIG. 13A schematically shows a longitudinal section through a stack of a system according to the type of system shown in FIG. 1, according to one embodiment.
FIG. 13B shows an enlargement of a detail from FIG. 13A.

On account of the cross-sectional area of the fluid line 25 decreasing in size in the fluid flow direction in the region of the end portion 28, a drop in pressure in this region 28 can thus be compensated, as a result of which for example the formation of vortices in the second end portion 28 can be prevented. Such a situation or a similar situation is also shown in FIG. 13A. FIG. 13A shows a simulation of the system 1, in which a fluid is flowing through the fluid line 25. It can clearly be seen in FIGS. 13A and 13B that the fluid line 25 has a flow cross-section that decreases in size in the fluid flow direction in the region of the second end portion 28. In contrast to those shown in FIG. 5, the flow lines shown in the fluid line 25 do not exhibit any vortices. This can lead to an increased efficiency of the adjoining electrochemical cells. Due to this increased efficiency, the system 1 can be made more compact overall compared to other systems, while maintaining the same performance.

On the other side of the stack 6 of FIG. 12, a further fluid line 35 is shown, which is formed in a similar way to the fluid line 25 by the through-openings 11 formed in the separator plates 2a, 2b and the through-openings 51 and fluid line portions 31 formed in the reinforcing edges 55. The fluid line 35 is designed to transport media away, such as reaction products, reaction media or coolant, in the direction of a fluid outlet.

The fluid line 35 comprises a first end portion 36, a middle portion 37 and a second end portion 38, each of which comprise a plurality of assemblies 30 which are fluidically connected to one another. The first end portion 36 is connected to a media port 5 of the second end plate 4 (not shown) configured as a fluid outlet and can thus be understood as a fluid outflow region 36. The second end portion 38 of the fluid line 25 adjoins the end plate 3 and is closed by the end plate 3 in a fluid-tight manner.

The first end plate 3 in the region of the fluid line 35 may optionally have a support element 39 for supporting a plurality of tabs 50 and for aiding fluid guidance in the fluid line 35. In the exemplary embodiment shown, the support element 39 is formed integrally with a plate body of the first end plate 3. The support element 39 may alternatively also be designed as a separate component connected to the end plate 3.

The support element 39 may be designed as a protrusion and as such can protrude into the fluid line 35. The support element 39 may have a shape that tapers in the direction of the fluid outflow region 36, that is to say in the flow direction. In the region of the support element where the tabs 50 are supported, the support element 39 may have a flow-optimized shape, for example a concave shape. By virtue of the support element 39, the tabs 50 can be deflected specifically in the direction of the fluid outlet. The support element 39 thus forms a deflection element for deflecting the tabs 50. The flexible tab 50 adjoining the support element 39 usually nestles against the concave shape of the support element 39. The support element 39 and the tabs 50 supported thereon may be designed in such a way that they conduct the fluid in the direction of the fluid outlet 5 of the second end plate 4. A cross-sectional area of the fluid line 35, measured in the region of the through-openings 51 of the reinforcing layer 55 and/or the through-openings 11 of the separator plates 2a, 2b, may increase in size in the fluid flow direction, such as between the second end portion 38 and the first end portion 36. Overall, a flow cross-section of the fluid line 35 can increase in the direction of the fluid outflow region 36, at least in some regions, owing to the tabs 50 and the support element 39.

The fluid lines 25 and 35 thus share the common feature that the cross-sectional area of the respective fluid line 25, 35, measured in the region of the through-openings 51 of the reinforcing layer 55 and/or the through-openings 11 of the separator plates 2a, 2b, decreases in the direction of the first end plate 3.

Figure 15:
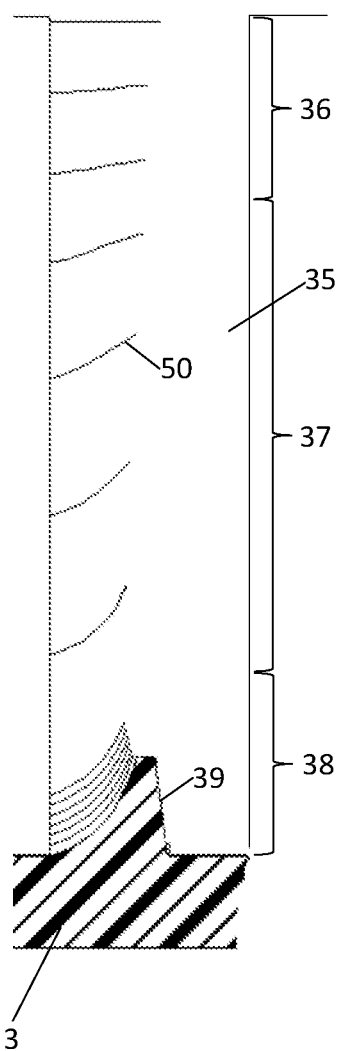
FIG. 15 schematically shows a longitudinal section through a fluid line in a rest state.
Figure 16:
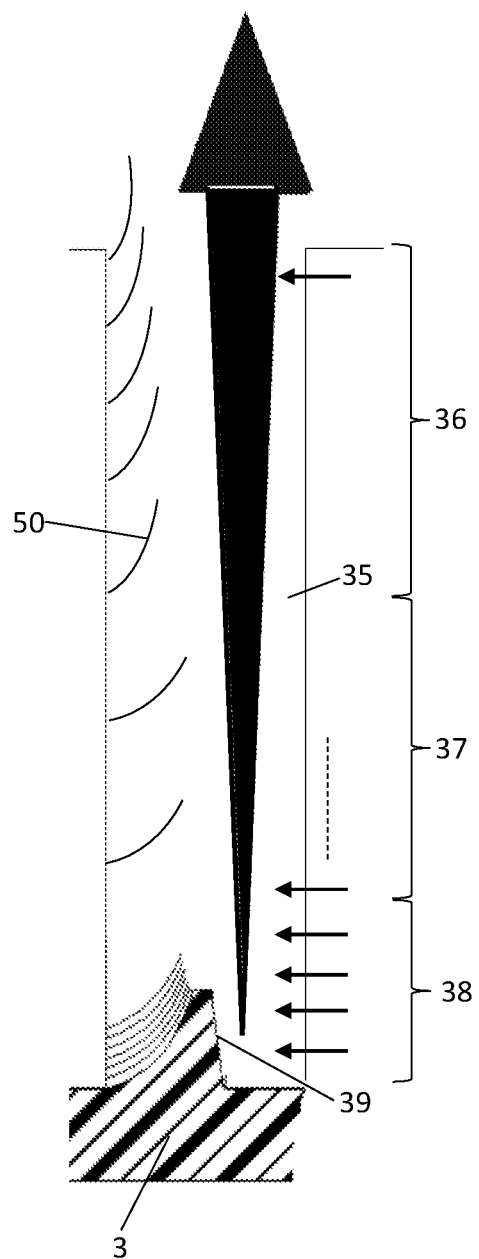
FIG. 16 schematically shows a longitudinal section through the fluid line of FIG. 15 in an operating state.

In the embodiment of FIG. 12, the tabs in the fluid line 35 are arranged on the side of the fluid line 35 facing towards the electrochemically active region, although this does not necessarily mean that the fluid flows into the fluid line 35 between the tabs 50. FIGS. 15 and 16 likewise show a sectional illustration of the fluid line 35; however, the fluid flows into the fluid line 35 from a side of the fluid line 35 remote from the tabs 50.

The stack 6 of FIG. 15 is shown in an idle state, that is to say no fluid is flowing in the stack 6. The same stack 6 is shown in FIG. 16 in an operating state. For clarity, a flow direction of the fluid is indicated by arrows in FIG. 16. Upon comparing FIGS. 15 and 16, it can be seen that, due to the fluid flow, the tabs 50 in FIG. 16 are deflected to a greater extent out of the plane E than the tabs 50 of FIG. 15.

In some embodiments, the free end of the respective tab 50 can be deflected out of the plane E for the first time by the action of the fluid flow, for example when the stack 6 or the system 1 is switched on for the first time. The tab 50 may be permanently deflected by the first deflection. Alternatively, the tab 50 may be deflected only while the fluid is flowing in. A mixed form is also possible, in which the tab 50 is permanently deflected following the first deflection and can be further deflected as additional fluid flows in. The first deflection of the tab 50 may also take place by means of an external device, for example by means of a plunger.

In the embodiments of FIGS. 11, 12, 13A, 13B, 15, 16, adjacent tabs 50 bear against one another. By way of example, to prevent individual tabs 50 from flapping or to arrest them in a (partially) deflected state, the tabs 50 may be connected to adjacent tabs 50 in a form-fitting, force-fitting and/or materially bonded manner. One example of tabs 50 connected to one another is shown in FIG. 14B.

FIGS. 14A and 14B show a further embodiment, in which the tab 50 has at least one cutout 53, such as a plurality of slot-shaped cutouts. The cutout 53 is shaped in such a way that it can receive a tab tip of a further tab 50 of an adjacent assembly 30. The cutout 53 is thus designed as a latching element for the adjacent tab 50. FIG. 14B shows that the tab tip of one tab 50 can engage in multiple cutouts 53 of different tabs 50. For instance, the tab 50 can be connected not only to the adjacent tab 50, but also to the next-adjacent tab 50.

Alternatively, an adhesive bonding of adjacent tabs 50 is also possible. In this case, the adhesive effect may be activated when the tabs 50 are in a predetermined position (for example the deflected position), for example via temperature, UV irradiation or moisture. To activate the adhesive bond, a device designed for this purpose, for example a heat lamp, a UV lamp or a moisture dispenser, can be moved through the respective fluid line 25, 35.

At least in one sub-region of the stack 6, but may be in the entire stack 6, all the MEAs 10 and/or all the separator plates 2a, 2b or bipolar plates 2 of the described embodiments are in each case structurally identical.

Features of the embodiments of FIGS. 6-16 can be combined with one another, insofar as they do not contradict one another. It should also be noted that the features of the systems and devices shown in FIGS. 1 to 5B can be combined with the embodiments of FIGS. 6-16.

FIGS. 1-16 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE SIGNS 1 electrochemical system
2 bipolar plate
2a individual plate
2b individual plate
3 end plate
4 end plate
5 media port
6 stack
7 z-direction
8 x-direction
9 y-direction
10 membrane electrode assembly
11 through-opening
11a-c through-openings
12a-c sealing beads
13a-c passages
14 membrane
16 gas diffusion layer
17 flow field
18 electrochemically active region
19 cavity
20 distribution and collection region
22 outer edge region
23 channel
24 contact region
25 fluid line
26 fluid inflow region
27 middle portion
28 end portion
29 fluid vortex
30 assembly
31 fluid line portion
35 fluid line
36 fluid inflow region
37 middle portion
38 end portion
39 support element
50 tab
50a-c tab
51 through-opening
51a-c through-openings
52 collar
53 cutout
55 reinforcing layer
56 projection area
58 electrochemically active region
61 overlap region
70 insulating coating

The invention claimed is:

1. An assembly for an electrochemical system, comprising:
a first separator plate;
a second separator plate; and
a membrane electrode assembly (MEA) arranged between the separator plates for forming an electrochemical cell between the separator plates, the MEA comprising:
an electrochemically active region;
at least one frame-like reinforcing layer surrounding the electrochemically active region;
at least one through-opening for the passage of a fluid formed in the reinforcing layer and in each separator plate, wherein the through-opening of the reinforcing layer and the through-openings of the separator plates are arranged in alignment with one another so as to form a fluid line portion;
a flexible tab of the reinforcing layer with a free end extending from an edge of the least one through-opening radially inward into the least one through-opening for influencing a fluid flow; and
a projection area defined by an orthogonal projection of at least one of the two through-openings of the separator plates onto the reinforcing layer, wherein the projection area at least partially overlaps with the tab.

2. The assembly according to claim 1, wherein the free end of the tab is deflected or can be deflected out of a plane defined by the reinforcing layer.

3. The assembly according to claim 2, wherein the deflection of the free end increases as a fluid volume flow and/or a fluid velocity increases.

4. The assembly according to claim 1, wherein the reinforcing layer has a collar which extends around the through-opening of the reinforcing layer, the tab being connected to the collar.

5. The assembly according to claim 4, wherein the collar lies inside said projection area.

6. The assembly according to claim 1, wherein the tab has at least one cutout for receiving a further tab of a further assembly.

7. The assembly according to claim 1, wherein the reinforcing layer is of single-layer or multi-layer construction and the tab has at most the same number of layers as the reinforcing layer.

8. A stack for an electrochemical system comprising a plurality of assemblies, each of the plurality of assemblies comprising:
- a first separator plate;
- a second separator plate; and
- a membrane electrode assembly (MEA) arranged between the separator plates for forming an electrochemical cell between the separator plates, the MEA comprising:
  - an electrochemically active region;
  - at least one frame-like reinforcing layer surrounding the electrochemically active region;
  - at least one through-opening for the passage of a fluid formed in the reinforcing layer and in each separator plate, wherein the through-opening of the reinforcing layer and the through-openings of the separator plates are arranged in alignment with one another so as to form a fluid line portion;
  - a flexible tab of the reinforcing layer with a free end extending from an edge of the least one through-opening radially inward into the least one through-opening for influencing a fluid flow; and
  - a projection area defined by an orthogonal projection of at least one of the two through-openings of the separator plates onto the reinforcing layer, wherein the projection area at least partially overlaps with the tab;

wherein the plurality of assemblies are stacked along a stacking direction and the fluid line portions thereof form a fluid line.

9. The stack according to claim 8, wherein an at least partially deflected tab protrudes into a fluid line portion of an adjacent assembly so that the fluid line has a changing cross-sectional area in at least some sections along the stacking direction, the changing cross-sectional area measured in the region of the through-opening of the reinforcing layer.

10. The stack according to claim 9, wherein the at least partially deflected tab engages in a cutout of an adjacent tab.

11. The stack according to claim 8, wherein, at least in a sub-region of the stack, all the MEAs and/or all the separator plates are structurally identical.

12. The stack according to claim 8, further comprising:
- a first end plate; and
- a second end plate,
wherein the MEAs and the separator plates are arranged between the first end plate and the second end plate, and at least one tab adjoining the first end plate being supported on the first end plate.

13. The stack according to claim 1, wherein the first end plate in the region of the fluid line has a support element for supporting a plurality of tabs and for aiding fluid guidance.

14. The stack according to claim 13, wherein the support element and the tabs supported thereon conduct the fluid in the direction of a fluid outlet.

15. An electrochemical system, comprising a plurality of the assemblies according to claim 1, and the plurality of assemblies are stacked along a stacking direction.

* * * * *